June 24, 1930. H. W. SCHON 1,767,556
CORN SHOCK BINDER
Filed March 21, 1929
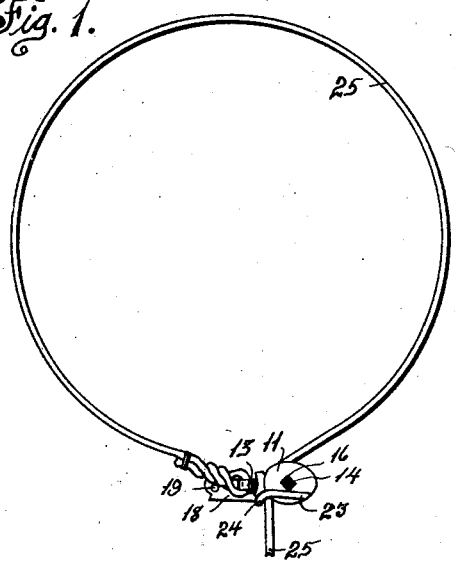
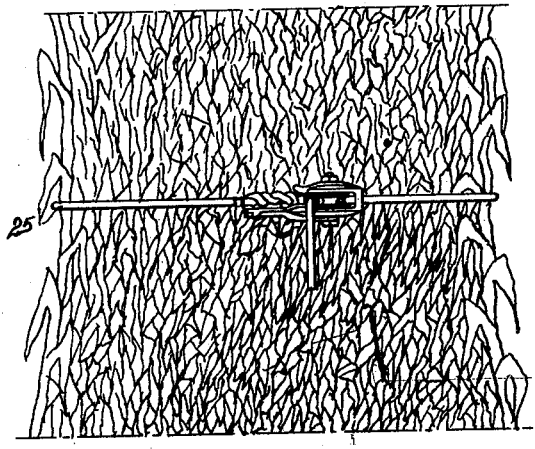
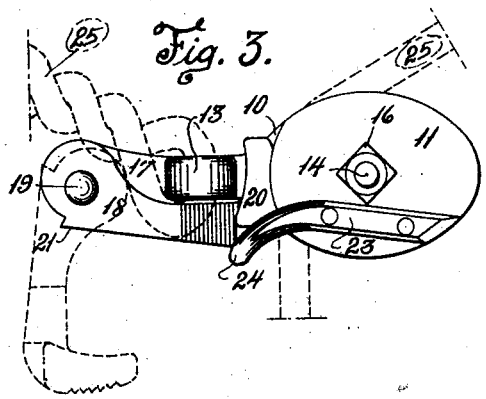
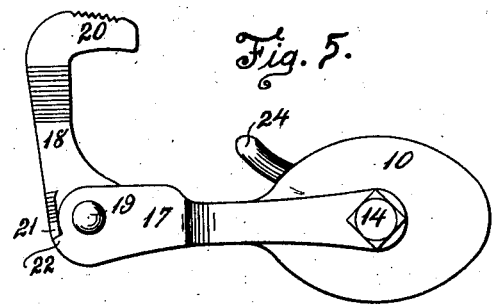
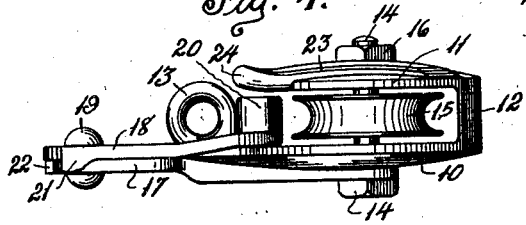
Inventor:
Heinrich Wm. Schon.
By
Attorney.

Patented June 24, 1930

1,767,556

UNITED STATES PATENT OFFICE

HEINRICH W. SCHON, OF POMEROY, IOWA

CORN-SHOCK BINDER

Application filed March 21, 1929. Serial No. 348,764.

The binding of severed corn stalks into compact shocks is a particularly difficult task owing to the weight and length of the stalks and the size of the shock customarily formed thereof, and it is the object of this invention to provide improved means for binding such shocks, said means being readily operable in a rapid and efficient manner to compact a shock and firmly bind the same.

A further object of the invention is to provide improved corn shock binding and tightening means which may be left on the shock as a permanent tie, or which may be removed from the shock for further use after a permanent tie has been applied to the shock compacted by my improved means.

My invention consists in the construction, arrangement and combination of elements hereinafter set forth, pointed out in my claims and illustrated by the accompanying drawing, in which—

Figure 1 is a plan view of my improved device as assembled for practical use. Figure 2 is a side elevation of a portion of a corn shock with my improved device mounted thereon in position for practical use.

Figure 3 is a plan view, on an enlarged scale, of the fastener employed in my improved tie, the locking dog being shown in holding position in full lines and in open position in dotted lines and the rope or cable portion of the tie being shown in dotted lines.

Figure 4 is a side elevation of the showing of Figure 3, the rope or cable being omitted.

Figure 5 is a bottom plan view of the improved fastener, the locking dog being shown in open position.

In the construction of the improvement as shown, a substantially U-shaped member is formed, preferably of metal by molding or forging, and comprises a relatively long arm 10, a relatively shorter arm 11 spaced from and parallel with the arm 10 and a base or connecting member 12 integral with and connecting the arms 10 and 11. The arms 10 and 11 are preferably substantially oval in plan and relatively narrow in elevation, and the free end of the arm 10 extends beyond the free end of the arm 11 to terminate in an integral eye 13 which extends in a plane perpendicular to the plane of the arm 10 substantially across the space between the arms 10 and 11 and spaced from the free end of said latter arm. A bolt 14 is mounted in registering apertures in the central portions of the arms 10 and 11 and extends across the space therebetween, said bolt serving as a pivot support for an antifriction roller or grooved wheel 15 rotatably mounted thereon in and substantially filling the space betwen the said arms 10 and 11, a nut 16 on the end of the bolt 14 serving to clamp said bolt to said arms. An extension 17 is formed integrally with or secured to the arm 10 and extends from the free end of said arm beyond the eye 13 and a dog 18 is pivotally secured at one end to and above said extension by means of a bolt or rivet 19 received in registering holes in said dog and extension. The dog 18 is formed with an enlarged head 20 on its free end, said head extending laterally from the shank of the dog and being formed with an eccentrically arcuate, serrated surface adapted to be presented in opposition to the periphery of the grooved wheel 15 when said dog is in holding position. The length of the dog is such as to permit the head 20 to be received in the space between the eye 13 and grooved wheel 15 at times, and the pivoted end of said dog is formed with a lug 21 turned down over the margin of the extension 17 and adapted to engage against an offset 22 formed on said extension, whereby the range of rotation of said dog is limited in an opening direction. A guard 23 is fixed to the upper surface of the arm 11 and extends beyond the free end of said arm in the form of a curved finger 24 substantially bridging the space between the free end of the arm 11 and the eye 13, but spaced laterally from said eye. A rope or flexible cable 25, of a length somewhat in excess of that necessary to surround a loose shock, is secured at one end to the eye 13 and is adapted to be looped around a shock and have its free end received and held in the fastener above described.

In the practical use of the improvement, the rope or cable is looped about a loose shock and the free end thereof passed under the finger 24 into the space between the eye 13 and wheel 15, the dog 18 being in the position shown by dotted lines in Figure 3. Tension then being applied to the free end of the rope or cable, the loop is narrowed and the shock compacted, the dog 18 being swung into the closed position confines the rope or cable between its arcuate, serrated face and the periphery of the wheel 15 and prevents loss of tension on the rope or cable, the eccentric curvature of said serrated face insuring a positive lock regardless of the tension on the rope or cable. The improved tie may be left on the bound shock indefinitely, or the shock may be bound with twine or rope and the tie removed, a simple jerk on the free end of the rope or cable 25 serving to loose the dog 18 and permit removal of the tie.

Since many variations of form and construction may be had in the improvement without departing from the spirit of my invention, I wish to be understood as being limited solely by the scope of the appended claims rather than by the illustrative showing or foregoing description.

I claim as my invention—

1. A corn shock binder comprising a loop of flexible material secured at one end to a fastener body and having its other end received through said fastener body for adjustable positioning therein, said fastener body comprising a U-shaped portion having arms of unequal length, an anti-friction roller pivotally mounted between said arms, an eye on the longer of said arms and spaced from said roller, a guard on the shorter of said arms extending toward and spaced laterally from said eye, said eye and guard cooperating to position the adjustable portion of said loop within said fastener body and adjacent said roller, an extension on the longer of said arms beyond said eye, a dog pivoted to said extension and a head laterally offset from the free end of said dog and adapted to be received at times between said eye and roller.

In witness whereof I affix my signature.

HEINRICH WM. SCHON.